US011662724B2

(12) United States Patent
Endo et al.

(10) Patent No.: US 11,662,724 B2
(45) Date of Patent: May 30, 2023

(54) VEHICLE CONTROL SYSTEM

(71) Applicant: TOYOTA JIDOSHA KABUSHIKI KAISHA, Toyota (JP)

(72) Inventors: Takahito Endo, Sunto-gun (JP); Yasuhiro Oshiumi, Gotemba (JP); Kensei Hata, Sunto-gun (JP); Yasuyuki Kato, Numazu (JP); Yushi Seki, Susono (JP); Katsuya Iwazaki, Susono (JP); Hideaki Komada, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/452,954

(22) Filed: Oct. 29, 2021

(65) Prior Publication Data

US 2022/0050456 A1 Feb. 17, 2022

Related U.S. Application Data

(60) Continuation of application No. 16/897,723, filed on Jun. 10, 2020, now Pat. No. 11,442,447, which is a
(Continued)

(30) Foreign Application Priority Data

Oct. 28, 2016 (JP) .............................. JP2016-212163

(51) Int. Cl.
*G05D 1/00* (2006.01)
*B60W 50/08* (2020.01)
(Continued)

(52) U.S. Cl.
CPC .......... *G05D 1/0061* (2013.01); *B60W 10/02* (2013.01); *B60W 10/06* (2013.01); *B60W 10/08* (2013.01);
(Continued)

(58) Field of Classification Search
CPC ..... G05D 1/0061; G05D 1/021; B60W 20/13; B60W 10/02; B60W 10/06; B60W 10/08;
(Continued)

(56) References Cited

U.S. PATENT DOCUMENTS 5,157,608 A * 10/1992 Sankpal .................. F16H 61/12
701/66
5,393,279 A * 2/1995 Bota ....................... F16H 61/08
477/143
(Continued)

FOREIGN PATENT DOCUMENTS

EP 0800951 A1 10/1997
JP 2014106854 A 6/2014
(Continued)

OTHER PUBLICATIONS

Zhou et al., "Development of Hybrid Powertrain Controller for a PSHEV," 2006, Publisher: IEEE.*
(Continued)

*Primary Examiner* — Tuan C To
(74) *Attorney, Agent, or Firm* — Hunton Andrews Kurth LLP

(57) ABSTRACT

A vehicle control system is provided to maintain an SOC level of the battery during autonomous operation of the vehicle. The control system is applied to a vehicle that can be operated autonomously by controlling an engine, a motor, a steering system, a brake system etc. autonomously by a controller, and the vehicle is allowed to coast by manipulating a clutch. During autonomous operation of the vehicle, a first coasting mode in which the engine is stopped and the clutch is disengaged is selected if the SOC level is higher than a threshold level, and a second coasting mode in which the engine is activated and the clutch is disengaged is selected if the SOC level is lower than the threshold level.

7 Claims, 8 Drawing Sheets

Related U.S. Application Data division of application No. 15/795,680, filed on Oct. 27, 2017, now Pat. No. 10,712,741.

(51) Int. Cl.

| | |
|---|---|
| *B60W 50/06* | (2006.01) |
| *B60W 10/06* | (2006.01) |
| *B60W 10/02* | (2006.01) |
| *B60W 10/08* | (2006.01) |
| *B60W 20/13* | (2016.01) |
| *B60W 20/00* | (2016.01) |
| *B60W 30/18* | (2012.01) |
| *G05D 1/02* | (2020.01) |

(52) U.S. Cl.
CPC ............ *B60W 20/00* (2013.01); *B60W 20/13* (2016.01); *B60W 30/18072* (2013.01); *B60W 50/06* (2013.01); *B60W 50/082* (2013.01); *G05D 1/0066* (2013.01); *G05D 1/021* (2013.01); *B60W 30/18127* (2013.01); *B60W 2510/244* (2013.01); *B60W 2540/043* (2020.02); *B60W 2552/15* (2020.02); *Y02T 10/60* (2013.01); *Y02T 10/62* (2013.01)

(58) Field of Classification Search
CPC ............... B60W 20/00; B60W 50/082; B60W 2510/244
USPC .......................................................... 701/23
See application file for complete search history.

(56) References Cited

U.S. PATENT DOCUMENTS

| | | | |
|---|---|---|---|
| 6,209,672 B1 | 4/2001 | Severinsky | |
| 7,374,513 B2* | 5/2008 | Whitton ................ | F16H 61/061 |
| | | | 477/145 |
| 9,026,296 B1 | 5/2015 | Johri et al. | |
| 9,045,136 B2 | 6/2015 | Frank et al. | |
| 9,346,450 B2 | 5/2016 | Park et al. | |
| 9,802,598 B2* | 10/2017 | Choi ........................ | B60K 6/48 |
| 9,898,928 B1* | 2/2018 | Payne .............. | G08G 1/096741 |
| 10,246,091 B2 | 4/2019 | La | |
| 10,328,817 B2 | 6/2019 | Hata et al. | |
| 2002/0023790 A1 | 2/2002 | Hata | |
| 2006/0027017 A1* | 2/2006 | Kamatsuke ............. | F02D 33/00 |
| | | | 73/1.73 |
| 2012/0310457 A1* | 12/2012 | Kim ..................... | F02D 41/3011 |
| | | | 903/903 |
| 2013/0006462 A1 | 1/2013 | Fleckner et al. | |
| 2014/0172211 A1* | 6/2014 | Kim ........................ | B60L 50/16 |
| | | | 701/22 |
| 2015/0183425 A1 | 7/2015 | Choi et al. | |
| 2015/0344021 A1* | 12/2015 | Kim ................. | B60W 30/18072 |
| | | | 180/65.265 |
| 2016/0017939 A1* | 1/2016 | Maeda .................. | B60W 10/06 |
| | | | 701/58 |
| 2016/0107634 A1 | 4/2016 | Kim et al. | |
| 2016/0153374 A1* | 6/2016 | Tashiro ............... | F02D 41/0002 |
| | | | 701/103 |
| 2016/0176399 A1* | 6/2016 | Takagi .................. | B60W 30/16 |
| | | | 701/301 |
| 2016/0272193 A1 | 9/2016 | Kim | |
| 2016/0303996 A1* | 10/2016 | Sponheimer ........ | B60L 15/2045 |
| 2017/0010612 A1* | 1/2017 | Asakura ........... | G08G 1/096783 |
| 2017/0166193 A1* | 6/2017 | Cheong .................. | B60L 50/16 |
| 2017/0166196 A1* | 6/2017 | Park ...................... | B60W 10/02 |
| 2018/0050685 A1* | 2/2018 | Atluri ................. | B60W 10/026 |
| 2018/0012084 A1 | 5/2018 | Endo et al. | |
| 2020/0301416 A1 | 9/2020 | Endo et al. | |

FOREIGN PATENT DOCUMENTS

| | | | |
|---|---|---|---|
| JP | 2016144977 A | 8/2016 | |
| KR | 20130068944 A | 6/2013 | |
| WO | 2012073890 A1 | 6/2012 | |
| WO | WO-2015193713 A1 * | 12/2015 | .............. F02B 75/02 |
| WO | WO-2016016390 A1 * | 2/2016 | .............. B60K 6/22 |
| WO | WO-2016083543 A1 * | 6/2016 | .............. B60K 31/00 |

OTHER PUBLICATIONS

Notice of Allowance, issued from the United States Patent and Trademark Office, to U.S. Appl. No. 16/897,723 dated May 12, 2022, 34 pages.

* cited by examiner

Fig. 3

| Coasting Mode | Condition | | | Engine | Clutch | Alternator | MOP | EOP | Battery | Engine Braking |
|---|---|---|---|---|---|---|---|---|---|---|
| | SOC | Road Gradient | Fuel Level | | | | | | | |
| First Coasting Mode | High | Flat Road or Mild Downhill | | Stopped | Disengaged | Stopped | Stopped | Driven | Discharge | Weak |
| Second Coasting Mode | Low | Flat Road or Mild Downhill | High | Activated | Disengaged | Generation | Driven | Stopped | Charged | Weak |
| Third Coasting Mode | Low | Steep Downhill | | Stopped | Engaged | Generation | Driven | Stopped | Charged | Strong |

Fig. 6

| Coasting Mode | Condition | | | Engine | First Clutch | Second Clutch | Motor Generator | MOP | EOP | Battery | Engine Braking |
|---|---|---|---|---|---|---|---|---|---|---|---|
| | SOC | Road Gradient | Fuel Level | | | | | | | | |
| Fourth Coasting Mode | Low | Steep Downhill | | Stopped | Engaged | Engaged | Generation | Driven | Stopped | Charged | Strong |
| Fifth Coasting Mode | High | Flat Road or Mild Downhill | | Stopped | Disengaged | Disengaged | Stopped | Stopped | Driven | Discharge | Weak |
| Sixth Coasting Mode | Mid | Mild Downhill | | Stopped | Disengaged | Engaged | Generation | Stopped | Driven | Charged | Mid |
| Seventh Coasting Mode | Low | Mild Downhill | High | Activated | Disengaged | Engaged | Generation | Driven | Stopped | Charged | Mid |
| Eighth Coasting Mode | Low | Flat Road | High | Activated | Engaged | Disengaged | Generation | Driven | Stopped | Charged | Weak |

Fig. 8

| Coasting Mode | Condition | | | | Engine | First Clutch | Second Clutch | Alternator | Motor Generator | MOP | EOP | First Battery | Second Battery | Engine Braking |
|---|---|---|---|---|---|---|---|---|---|---|---|---|---|---|
| | First SOC | Second SOC | Road Gradient | Fuel Level | | | | | | | | | | |
| Ninth Coasting Mode | Low | Low | Steep Downhill | / | Stopped | Engaged | Engaged | Generation | Generation | Driven | Stopped | Charged | Charged | Strong |
| Tenth Coasting Mode | High | High | Flat Road or Mild Downhill | / | Stopped | Disengaged | Disengaged | Stopped | Stopped | Stopped | Driven | Discharge | Discharge | Weak |
| Eleventh Coasting Mode | Mid | Mid | Mild Downhill | / | Stopped | Disengaged | Engaged | Stopped | Generation | Stopped | Driven | Charged | Charged | Mid |
| Twelfth Coasting Mode | Low | Low | Mild Downhill | High | Activated | Disengaged | Engaged | Generation | Generation | Driven | Stopped | Charged | Charged | Mid |
| Thirteenth Coasting Mode | Low | Low | Flat Road | High | Activated | Engaged | Disengaged | Generation | Generation | Driven | Stopped | Charged | Charged | Weak |

VEHICLE CONTROL SYSTEM

CROSS REFERENCE TO RELATED APPLICATIONS

This is a continuation application of U.S. patent application Ser. No. 16/897,723, filed Jun. 10, 2020, which is a divisional application of U.S. patent application Ser. No. 15/795,680, filed Oct. 27, 2017, which claims the benefit of priority to Japanese Patent Application No. 2016-212163 filed on Oct. 28, 2016 with the Japanese Patent Office, the entire contents of all which are incorporated herein by reference in their entirety.

BACKGROUND

Field of the Invention

Embodiments of the present disclosure relate to the art of a control system of an autonomous vehicle.

Discussion of the Related Art

JP-A-2014-106854 describes an automatic driving vehicle control apparatus for operating vehicles autonomously without a driver. The control apparatus taught by JP-A-2014-106854 includes a detection means that acquires a running state of the vehicle, a circumferential state of the vehicle, and a state of the driver. When the condition for automatic operation is satisfied, the control apparatus operates the vehicle autonomously by controlling actuators for controlling output power, braking force, steering angle, etc.

According to the teachings of JP-A-2014-106854, the running state detection means includes a GPS unit, a vehicle speed sensor, an acceleration sensor, and a steering angle sensor. The circumferential state detection means includes a RADAR an on-board camera, an inter-vehicle communication system. The driver state detection means includes a biometric sensor for detecting a cardiac beat, and a camera for detecting an expression and a pupil of the passenger.

In the conventional automobiles, a power transmission between an engine and drive wheels may be interrupted by releasing a power transmission clutch to save fuel.

In the conventional autonomous vehicle, however, a battery may not be charged during coasting while the engine is stopped. In this situation, electricity is continuously consumed to actuate the actuators such as the steering actuator, and consequently a state of charge level of the battery may drop excessively. In addition, during coasting of the vehicle, a mechanical oil pump may not be driven by the engine to apply the power transmission clutch. For this reason, it is necessary to driven an electric oil pump to apply the power transmission clutch and hence the charge level of the battery may further drop. In this situation, the vehicle may not be operated autonomously.

SUMMARY

Aspects of embodiments of the present disclosure have been conceived noting the foregoing technical problems, and it is therefore an object of the present disclosure is to provide a vehicle control system configured to maintain a state of charge level of the battery during autonomous operation of the vehicle.

The control system according to at least one of the embodiments of the present disclosure may comprise: an engine that generates a drive force by burning fuel; a generator that generates electricity by the drive force generated by the engine or a force delivered from drive wheels to the engine; a battery that is charged by the electricity delivered from the generator; a clutch that selectively interrupts power transmission between the engine and the drive wheels; a state of charge detector that detects a state of charge level of the battery; a brake system that applies braking torque to wheels; a steering system that turns the wheels; and a controller that controls the engine and the clutch. The vehicle may be operated autonomously without requiring a driver by controlling at least the engine, the clutch, the generator, the battery, the brake system and the steering system. In addition, the vehicle is allowed to coast by manipulating the clutch. Specifically, the controller is configured to: determine execution of autonomous operation of the vehicle, satisfaction of a predetermined condition to allow the vehicle to coast, and the state of charge level of the battery; select a first coasting mode in which the engine is stopped and the clutch is disengaged, in a case that the predetermined condition is satisfied during autonomous operation of the vehicle, and that the state of charge level of the battery is higher than a threshold level; and select a second coasting mode in which the engine is activated and the clutch is disengaged, in a case that the predetermined condition is satisfied during autonomous operation of the vehicle, and that the state of charge level of the battery is lower than the threshold level.

In a non-limiting embodiment, the control system may further comprise a road grade detector that estimates a grade of a road on which the vehicle travels. In addition, the controller may be further configured to: determine the grade of the road on which the vehicle travels; and select a third coasting mode in which the engine is stopped and the clutch is engaged, in a case that the predetermined condition is satisfied during autonomous operation of the vehicle, that the state of charge level of the battery is lower than the threshold level, and that a downhill grade of the road is steeper than a threshold grade.

In a non-limiting embodiment, the control system may further comprise: a fuel level detector that detects a fuel level in a fuel tank; and a passenger sensor that detects an existence of a passenger in the vehicle. In addition, the controller may be further configured to: determine the fuel level in the fuel tank, and the existence of the passenger in the vehicle; and terminate the autonomous operation of the vehicle in a case that the predetermined condition is satisfied during autonomous operation of the vehicle, that the state of charge level of the battery is lower than the threshold level, that the fuel level is lower than a threshold fuel level, and that the vehicle carries the passenger.

In a non-limiting embodiment, the control system may further comprise: a fuel level detector that detects a fuel level in a fuel tank; and a passenger sensor that detects an existence of a passenger in the vehicle. In addition, the controller may be further configured to: determine the fuel level in the fuel tank, and the existence of the passenger in the vehicle; and set a destination of the vehicle to at least one of a gas station and a charging station in a case that the predetermined condition is satisfied during autonomous operation of the vehicle, that the state of charge level of the battery is lower than the threshold level, that the fuel level is lower than a threshold fuel level, and that the vehicle is operated without carrying a passenger.

In a non-limiting embodiment, the control system according to another embodiment of the present disclosure may comprise: an engine that generates a drive force by burning fuel; a motor having a generating function; a battery that is charged by electricity delivered from the motor; a state of charge detector that detects a state of charge level of the battery; a first clutch that selectively interrupts power transmission between the engine and the motor; a second clutch that selectively interrupts power transmission between the motor and the drive wheels; a road grade detector that estimates a grade of a road on which the vehicle travels; a brake system that applies braking torque to wheels; a steering system that turns the wheels; and a controller that controls the engine, the first clutch and the second clutch. The vehicle may be operated autonomously without requiring a driver by controlling at least the engine, the battery, the motor, the first clutch, the second clutch, the brake system and the steering system. In addition, the vehicle is allowed to coast by manipulating the first clutch and the second clutch. Specifically, the controller is configured to: determine execution of autonomous operation of the vehicle, satisfaction of a predetermined condition to allow the vehicle to coast, the state of charge level of the battery, and the grade of the road on which the vehicle travels; select a fourth coasting mode in which the engine is stopped and the first clutch and the second clutch are engaged, in a case that the predetermined condition is satisfied during autonomous operation of the vehicle, that the state of charge level of the battery is lower than a first threshold level, and that a downhill grade of the road is steeper than a first threshold grade; select a fifth coasting mode in which the engine is stopped and the first clutch and the second clutch are disengaged, in a case that the predetermined condition is satisfied during autonomous operation of the vehicle, that the state of charge level of the battery is higher than the first threshold level, and that the downhill grade of the road is milder than the first threshold grade; and select a sixth coasting mode in which the engine is stopped, the first clutch is disengaged, and the second clutch is engaged, in a case that the predetermined condition is satisfied during autonomous operation of the vehicle, that the state of charge level of the battery is higher than the first threshold level but lower than a second threshold level, and that the downhill grade of the road is milder than the first threshold grade.

In a non-limiting embodiment, the control system may further comprise a fuel level detector that detects a fuel level in a fuel tank. In addition, the controller may be further configured to: determine the fuel level in a fuel tank; select a seventh coasting mode in which the engine is activated, the first clutch is disengaged, and the second clutch is engaged, in a case that the predetermined condition is satisfied during autonomous operation of the vehicle, that the downhill grade of the road is milder than the first threshold grade but steeper than a second threshold grade, and that the that the fuel level is higher than a threshold fuel level; and select an eighth coasting mode in which the engine is activated, the first clutch is engaged and the second clutch is disengaged, in a case that the predetermined condition is satisfied during autonomous operation of the vehicle, that the downhill grade of the road is milder than the second threshold grade, and that the that the fuel level is higher than the threshold fuel level.

In a non-limiting embodiment, the control system may further comprise a generator that is rotated by an output power of the engine to generate electricity. In addition, the battery may include a first battery that is charged with the electricity generated by the generator and that supplies electricity to an auxiliary activated by low-voltage, and a second battery that is charged with the electricity generated by the motor and that supplies electricity to an auxiliary activated by high-voltage.

In a non-limiting embodiment, the control system may further comprise a passenger sensor that detects an existence of a passenger in the vehicle. In addition, the controller may be further configured to: determine the existence of the passenger in the vehicle; and terminate the autonomous operation of the vehicle in a case that the predetermined condition is satisfied during autonomous operation of the vehicle, that the state of charge level of the battery is lower than the first threshold level, that the downhill grade of the road is milder than the first threshold grade, that the fuel level is lower than the threshold fuel level, and that the vehicle carries the passenger.

In a non-limiting embodiment, the control system may further comprise a passenger sensor that detects an existence of a passenger in the vehicle. In addition, the controller may be further configured to: determine the existence of the passenger in the vehicle; and set a destination of the vehicle to at least one of a gas station and a charging station in a case that the predetermined condition is satisfied during autonomous operation of the vehicle, that the state of charge level of the battery is lower than the first threshold level, that the downhill grade of the road is milder than the first threshold grade, that the fuel level is lower than the threshold fuel level, and that the vehicle is operated without carrying a passenger.

Thus, according to the embodiments of the present disclosure, the coasting mode may be selected from a plurality of modes to prevent a reduction of the state of charge level of the battery. Specifically, if the state of charge level is lower than the threshold level, the second coasting mode in which the clutch is disengaged and the engine is activated is selected to allow the vehicle to coast while charging the battery. According to the embodiments of the present disclosure, therefore, the autonomous operation of the vehicle will not be terminated undesirably due to reduction of the state of charge level of the battery.

The third coasting mode is selected when the state of charge level of the battery is lower than the threshold level, and the downhill grade of the road is steeper than a threshold grade. In the third coasting mode, the engine is inactivated but rotated by torque delivered from the wheels so that the generator is rotated by a rotation of the engine to charge the battery. In addition, in the third coasting mode, an engine braking force may be established to reduce a vehicle speed.

When the state of charge level of the battery is lower than the threshold level and the fuel level is lower than the threshold fuel level during autonomous operation while carrying the passenger, the autonomous operation is terminated to allow the passenger to operate the vehicle manually. In this case, the vehicle is allowed to go to the gas station or the charging station before running out of the fuel.

The control system is further configured to take the vehicle to the gas station or the charging station before running out of the fuel even if the vehicle is operated autonomously without carrying the passenger.

The fourth coasting mode in which the engine is stopped and the first clutch and the second clutch are engaged is selected when the state of charge level of the battery is lower than the first threshold level, and the downhill grade of the road is steeper than a first threshold grade. In the fourth coasting mode, therefore, the battery may be charged while establishing an engine braking force.

The seventh coasting mode and the eighth coasting mode are selected when the fuel level of the battery is sufficiently high. In the seventh coasting mode and the eighth coasting mode, therefore, the vehicle may be powered by the engine while charging the battery.

In addition, since two batteries are arranged in the vehicle, the coasting mode may be selected depending on the state of charge levels of those batteries.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 3 is a table showing conditions for determining the coasting mode according to the first example;

FIG. 6 is a table showing conditions for determining the coasting mode in the vehicle according to the second example;

FIG. 8 is a table showing conditions for determining the coasting mode in the vehicle according to the third example.

DETAILED DESCRIPTION OF THE PREFERRED EMBODIMENT(S)

Preferred embodiments of the present application will now be explained with reference to the accompanying drawings.

Figure 1:
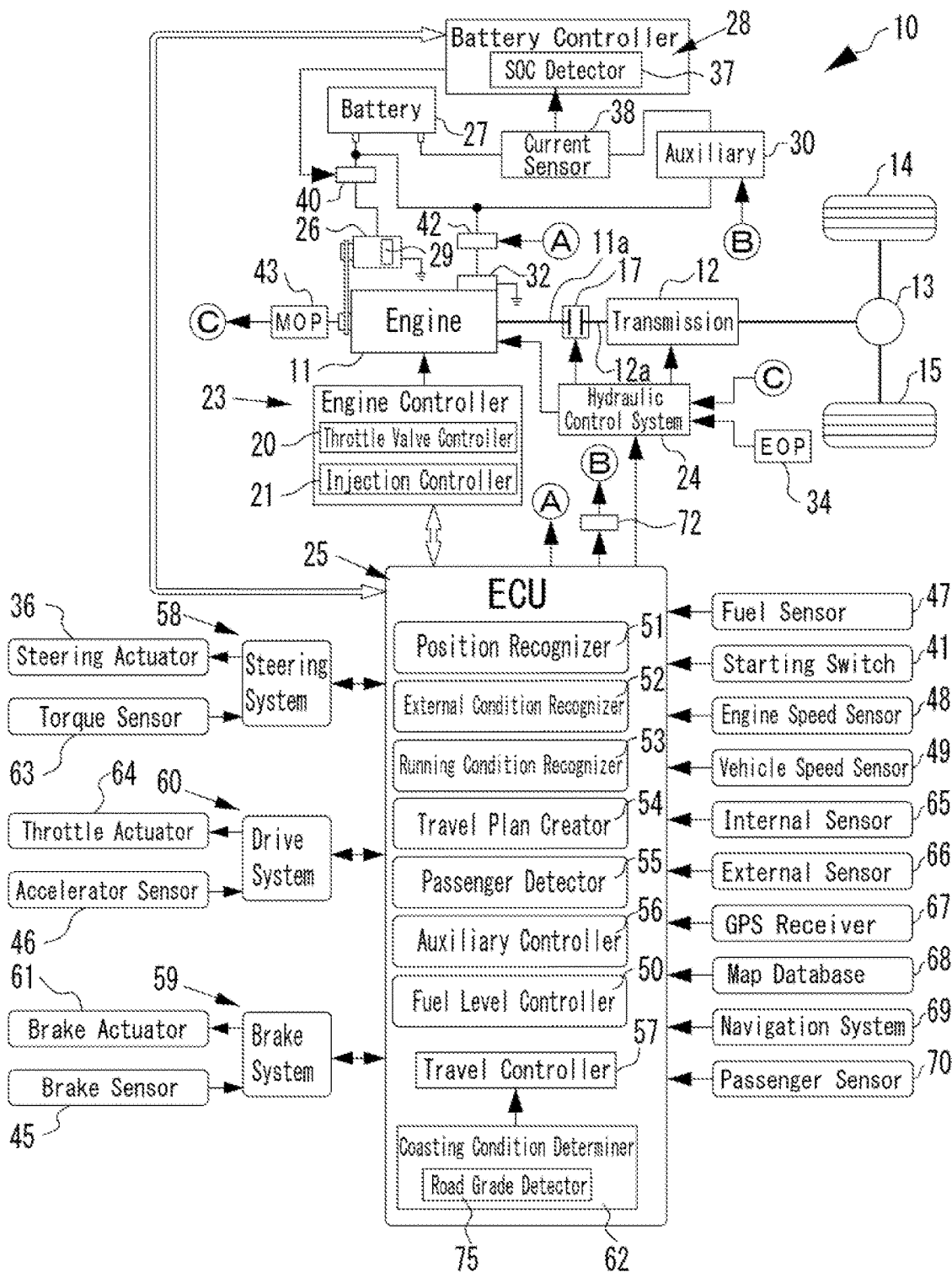
FIG. 1 is a schematic illustration showing a first example of a vehicle to which the control system according to the present disclosure is applied.

Referring now to FIG. 1, there is schematically shown a first example of a vehicle 10. An operating mode of the vehicle 10 may be selected from a manual mode in which the vehicle 10 is operated by a driver, and an autonomous mode in which the vehicle 10 is operated autonomously even if the vehicle 10 does not carry any passenger. For example, the operating mode is shifted from the autonomous mode to the manual mode when the driver operates a steering wheel, an accelerator pedal, or a brake pedal intentionally. In addition, the vehicle 10 may be operated completely autonomously without stay in a specific formation of vehicles.

According to the first example, the vehicle 10 is provided with an engine 11 as a prime mover for generating driving force. Output power of the engine 11 is delivered to a pair of rear wheels (i.e., drive wheels) 14 and 15 through an automatic transmission (as will be simply called the "transmission" hereinafter) 12 and a differential gear unit 13. In order to selectively transmit power between the engine 11 and the drive wheels 14 and 15, a clutch 17 is disposed between the engine 11 and the transmission 12.

The engine 11 comprises a plurality of cylinders individually having a combustion chamber and a piston held in the cylinder while being allowed to reciprocate within the cylinder (neither of which are shown). A reciprocating motion of each of the pistons is translated into a rotary motion through a connecting rod to rotate an output shaft 11a through a crankshaft (not shown) of the engine 11.

According to the embodiments of the present disclosure, not only a diesel engine but also a gasoline engine may be used as the engine 11. In the engine 11, number of the cylinders and valves etc. may be altered according to need. Alternatively, the output power of the engine 11 may also be applied to front wheels (not shown) instead of the rear wheels 14 and 15.

The clutch 17 is interposed between the output shaft 11a of the engine 11 and an input shaft 12a of the transmission 12 to selectively transmit power between the output shaft 11a and the input shaft 12a. Optionally, a damper device and a torque converter may be arranged between the clutch 17 and the transmission 12.

In order to control the engine 11, an engine controller 23 is electrically connected to the engine 11. The engine controller 23 comprises a throttle valve controller 20 and an injection controller 21. Specifically, the throttle valve controller 20 is configured to control an opening degree of a throttle valve in accordance with a position of an accelerator pedal thereby controlling an air intake. The injection controller 21 is configured to control fuel injection, and further configured to execute a fuel cut-off control for stopping fuel supply to the engine 11 upon satisfaction of a predetermined condition. Here, the fuel 1 cut-off control may be executed to stop fuel supply only to some of the cylinder(s).

An electronic control unit (to be abbreviated as the "ECU" hereinafter) 25 as a main controller is electrically connected to the engine controller 23 and a battery controller 28.

The battery controller 28 is electrically connected to an alternator 26 as a generator through a first switch 40. The alternator 26 is rotated by a part of the power generated by the engine 11 to convert mechanical energy of the engine 11 to electrical energy in the form of three-phase alternating current. The alternating current thus generated is rectified into a direct current by a rectifier circuit including a diode to be delivered to a battery 27 through the first switch 40. To this end, the alternator 26 comprises a voltage controller 29 such as a voltage regulator for regulating an output voltage according to need.

The first switch 40 comprises a switch that is turned off when the battery 27 is almost fully charged, and a switch operated in conjunction with an operation of a starting switch 41 such as an ignition switch. In the first switch 40, those switches are connected in series. An auxiliary 30 such as an electrical load is connected to the voltage controller 29 of the alternator 26 through a change-over switch and the starting switch 41. According to the embodiments, the auxiliary 30 includes an ignition plug, an air compressor, an actuator of door window, lighting devices, an electric oil pump 34, a steering actuator 36, and on-board sensors such as a RADAR (i.e., a radio detection and ranging), a LIDAR (i.e., a laser imaging detection and ranging), an on-board camera and so on.

The battery 27 includes a secondary battery and a lead battery, and charged with the electricity generated by the alternator 26. The electricity stored in the battery 27 is supplied to the auxiliary 30.

The battery controller 28 comprises a state of charge detector (to be abbreviated as the "SOC detector" hereinafter) 37 that detects a state of charge level (to be abbreviated as the "SOC level" hereinafter) of the battery 27 based on a charge current value and a discharge current value detected by a current sensor 38.

In order to regenerate electric energy by the alternator 26, the ECU 25 observes the SOC level of the battery 27. Specifically, during operation of the engine 11, the ECU 25 stops generation of the alternator 26 to reduce a load on the engine 11 thereby saving the fuel, and supplies electricity to the auxiliary 30 from the battery 27. By contrast, during execution of the fuel cut-off control while the vehicle 10 is decelerating or coasting, the engine 11 is rotated by a torque from the drive wheels 14 and 15. In this situation, the ECU 25 allows the alternator 26 to generate electricity to charge the battery 27 by driving the alternator 26 a rotation of the engine 11. Thus, the ECU 25 selectively allows the alternator 26 to regenerate power depending on a running condition of the vehicle 10.

The battery controller 28 transmits information about the SOC level of the battery 27 detected by the SOC detector 37 to the ECU 25 so that the ECU determines the SOC level of the battery 27. In order to prevent the battery 27 from being fully charged, when the battery 27 is almost fully charged, the ECU 25 turns off the first switch 40 to stop power supply to the battery 27. Thus, the ECU 25 and the battery controller 28 serve as the controller of the embodiments of the present disclosure.

The engine 11 is provided with a starter motor 32 for cranking the crankshaft to start the engine 11. When the starting switch 41 is turned on, the ECU 25 sends a command signal to start the engine 11 to a second switch 42. The second switch 42 is turned on upon reception of the command signal from the ECU 25, and consequently the starter motor 32 is activated by the electricity supplied from the battery 27.

As described, the auxiliary 30 includes the electric oil pump (referred to as "EOP" in FIG. 1) 34 that is activated by the electricity supplied from the battery 27. A hydraulic control system 24 comprises a mechanical oil pump (referred to as "MOP" in FIG. 1) 43 driven by the crankshaft of the engine 11, and an oil passage (not shown) connected to the electric oil pump 34 and the mechanical oil pump 43. For example, the electric oil pump 34 and the mechanical oil pump 43 are driven to deliver pressurized oil to the hydraulic control system 24 so as to maintain a pressure level of operating oil to a predetermined level. Specifically, cooling oil, lubrication oil, operating oil are supplied to the engine 11, the clutch 17, the transmission 12 and so on from the hydraulic control system 24.

In a case of using a geared transmission as the transmission 12, a gear stage of the transmission 12 may be selected from a plurality of stages by manipulating clutches and brakes to change a speed ratio. In order to shift the gear stage of the transmission 12, the hydraulic control system switches the oil passage in such a manner as to shift the gear stage to the target stage commanded by the ECU 25. Instead, a belt-driven continuously variable transmission may also be used as the transmission 12.

The clutch 17 serving as an input clutch of the transmission 12 is a frictional engagement device that is hydraulically engaged and disengaged by the hydraulic control system 24. According to the embodiments of the present disclosure, the ECU 25 is configured to select a coasting mode of the vehicle 10 depending on the situation.

The coasting mode may be selected from a first coasting mode, a second coasting mode and a third coasting mode. Specifically, in the first coasting mode, the clutch 17 is disengaged to disconnect the engine 11 from the drive wheels 14 and 15, and the engine 11 is stopped (i.e., free-run mode). In turn, in the second coasting mode, the clutch 17 is also disengaged to disconnect the engine 11 from the drive wheels 14 and 15, and the fuel is supplied to at least some of the cylinders of the engine 11 (i.e., neutral coasting mode). By contrast, in the third coasting mode, the clutch 17 is engaged to connect the engine 11 to the drive wheels 14 and 15, and fuel supply to the engine 11 is stopped (i.e., fuel-cut coasting mode).

The ECU 25 is a microcomputer comprising a CPU (i.e., Central Processing Unit), a ROM (i.e., Read Only Memory) a RAM (i.e., Random Access Memory), an input interface and an output interface. Specifically, the ECU 25 controls the battery controller 28 and the engine controller 23 utilizing data stored temporarily in the RAM and programs installed in the ROM. To this end, to the ECU 25, information about depression of the brake pedal is transmitted from a brake sensor 45, and information about depression of the accelerator pedal is transmitted from an accelerator sensor 46. The ECU 25 comprises a fuel level detector 50, and information about fuel level in a fuel tank is transmitted to the fuel level detector 50 from a fuel sensor 47 such as a fuel level gauge.

An engine speed sensor 48 is attached to the crankshaft of the engine 11 to send information about engine speed to the ECU 25. Likewise, a vehicle speed sensor 49 is attached to the output shaft of the transmission 12 to send information about vehicle speed to the ECU 25.

The ECU 25 is further configured to obtain a required power of the engine 11 based on a position of the accelerator pedal, and to shift the gear stage of the transmission 12 based on the obtained engine power and a current vehicle speed with reference to a shift map. In a case that the vehicle 10 is operated autonomously, a required engine power is calculated while taking account of a speed limit of a road, a road grade, a distance from a car ahead, a steering angle etc.

In order to control a steering system 58, a drive system 60 and a brake system 59 during autonomous propulsion of the vehicle 10 the ECU 25 further comprises a position recognizer 51, an external condition recognizer 52, a running condition recognizer 53, a travel plan creator 54, a passenger detector 55, an auxiliary controller 56 a travel controller 57, a coasting condition determiner 62.

The drive system 60 comprises a throttle actuator 64 that actuates a throttle valve in accordance with a command from the ECU 25, and an accelerator sensor 46 that detects a position of the accelerator pedal. The detected position of the accelerator pedal is sent to the ECU 25. During autonomous propulsion, the throttle actuator 64 is controlled based on a required power calculated by the ECU 25. The throttle actuator 64 and the accelerator sensor 46 are also activated by the electricity supplied from the battery 27.

The brake system 59 comprises a brake actuator 61 that actuates a brake device to apply braking force (or braking torque) to the wheels in accordance with a command from the ECU 25, and a brake sensor 45 that detects a depression of the brake pedal. The detected depression of the brake pedal is also sent to the ECU 25. During autonomous propulsion, the brake actuator 61 is controlled based on a required braking force calculated by the ECU 25. The brake actuator 61 and the brake sensor 45 are also activated by the electricity supplied from the battery 27.

The steering system 58 comprises the steering actuator 36 and a torque sensor 63. The steering system 58 is also controlled by the ECU 25 to turn e.g., a pair of front wheels by the steering actuator 36, and the steering system 58 includes an electric power steering system and an SBW (i.e., a steer by wire) system. In the steering system 58, a plurality of the steering actuator 36 may be used to turn the wheels. The torque sensor 63 detects a torque applied to a steering wheel by the driver, and the detected torque is also sent to the ECU 25. During autonomous propulsion, the steering actuator 36 is controlled based on a required steering angle calculated by the ECU 25. The steering actuator 36 and the torque sensor 63 are also activated by the electricity supplied from the battery 27.

In order to operate the vehicle 10 autonomously, the ECU 25 is connected to an internal sensor 65, an external sensor 66, a GPS (i.e., a Global Positioning System) receiver 67, a map database 68, a navigation system 69 and a passenger sensor 70. The internal sensor 65 includes different kinds of sensors for detecting conditions and behaviors of the vehicle 10, the engine 11, and the transmission 12. Specifically, the internal sensor 65 includes a longitudinal acceleration sensor for detecting a longitudinal acceleration of the vehicle 10, a lateral acceleration sensor for detecting a lateral acceleration of the vehicle 10, a yaw rate sensor for detecting a yaw rate of the vehicle 10, a shift sensor for detecting a position of a shift lever (or a shift switch) and so on. The aforementioned torque sensor 63, the accelerator sensor 46, the brake sensor 45, the vehicle speed sensor 49 may serve as the internal sensor 65. The longitudinal acceleration sensor, the lateral acceleration sensor, the yaw rate sensor, the shift sensor are also activated by the electricity supplied from the battery 27.

In FIG. 1, the above-mentioned longitudinal acceleration sensor etc. are simply referred to as "Internal Sensor" 65.

The ECU 25 carries out a calculation based on incident data from the above-mentioned sensors as well as data and formulas installed in advance, and transmits calculation results in the form of command signals to the engine controller 23, the steering system 58, the brake system 59, the drive system 60, the hydraulic control system 24 and so on.

The external sensor 66 for detecting an external condition includes at least one of the aforementioned on-board camera, the RADAR, the LIDAR. The external sensor 66 is also activated by the electricity supplied from the battery 27.

Specifically, the on-board camera is arranged inside of a windshield and transmits recorded information about the external condition to the ECU 25. To this end, not only a monocular camera but also a stereo camera having a plurality of lenses and image sensors to achieve a binocular vision may be used as the on-board camera. If the stereo camera is used as the on-board camera, the ECU 25 is allowed to obtain three-dimensional information of the recorded object.

The RADAR is adapted to detect obstacles utilizing radio waves such as millimetric-waves and microwaves, and to transmit detected information to the ECU 25. Specifically, the RADAR detects an obstacle such as other vehicles and so on by emitting radio waves and analyzing the radio waves reflected from the obstacle.

The LIDAR is adapted to detect obstacles utilizing laser light and to transmit detected information to the ECU 25. Specifically, the LIDAR detects an obstacle such as other vehicles and so on by emitting laser light and analyzing the laser light reflected from the obstacle.

The GPS receiver 67 is adapted to obtain positional information such as latitude and longitude of the vehicle 10 based on incident signals from GPS satellites, and to transmit the positional information to the ECU 25. As the map database 68, map information stored in external online information processing systems may be available. Alternatively, the map database 68 may also be stored in a storage device of the ECU 25. The navigation system 69 is configured to determine a travelling route of the vehicle 10 based on the positional information obtained by the GPS receiver 67 and the map database 68.

The position recognizer 51 is configured to recognize a current position of the vehicle 10 on a map based on positional information received by the GPS receiver 67 and the map database 68. The current position of the vehicle 10 may also be obtained from the positional information used in the navigation system 69. Optionally, the vehicle 10 may also be adapted to communicate with external sensors and signposts arranged along the road to obtain the current position of the vehicle 10.

The external condition recognizer 52 is configured to recognize external condition of the vehicle 10 such as a location of a traffic lane, a road width, a road configuration, a road grade, an existence of obstacles around the vehicle 10 and so on, based on the recorded information of the on-board camera, or detection data of the RADAR or the LIDAR. Optionally, weather information, a friction coefficient of road surface etc. may be obtained according to need.

The running condition recognizer 53 is configured to recognize running condition of the vehicle 10 such as a vehicle speed, a longitudinal acceleration, a lateral acceleration, a yaw rate and so on based on detection result of the internal sensors 65.

The travel plan creator 54 is configured to create a travel locus of the vehicle 10 based on a target course determined by the navigation system 69, a position of the vehicle 10 recognized by the position recognizer 51, and an external condition recognized by the external condition recognizer 52. That is, the travel plan creator 54 creates a travel locus of the vehicle 10 within the target course in such a manner that the vehicle 10 is allowed to travel safely and properly while complying with the traffic rules.

In addition, the travel plan creator 54 is further configured to create a travel plan in line with the travel locus and the target course created based on the external conditions recognized by the external condition recognizer 52 and the map database 68.

Specifically, the travel plan is created based on prospective data after few seconds from the present moment to determine a future condition of the vehicle 10 such as a driving force or the like required in future. Optionally, the travel plan may also be created based on prospective data after several ten seconds depending on the external conditions and the running conditions. Thus, the travel plan creator 54 creates a future plan to change a vehicle speed, acceleration, steering torque etc. during travelling along the target course in the form of e.g., a map.

Alternatively, the travel plan creator 54 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller 57 is configured to operate the vehicle 10 autonomously in line with the travel plan created by the travel plan creator 54. To this end, specifically, the travel controller 57 transmits command signals to the engine controller 23, the drive system 60, the brake system 59 and the steering system 58 to manipulate the throttle actuator 64, the brake actuator 61, the steering actuator 36 and so on in accordance with the travel plan. In addition, the travel controller 57 is further configured to switch a control mode from a normal control mode to a coast control mode upon satisfaction of a predetermined condition.

The passenger sensor 70 comprises a weight sensor that is arranged e.g., in a seat base to detect the existence of the passenger, a passenger condition sensor such as a biometric sensor for detecting e.g., a cardiac beat of the passenger, and a camera for detecting a facial expression and a condition of pupil of the passenger. Such information detected by the passenger sensor 70 is sent to the ECU 25.

The auxiliary controller 56 is configured to operate the auxiliaries 30 through an auxiliary system 72. The auxiliaries 30 further include the starter motor 32, the throttle actuator 64, the brake actuator 61, the passenger sensor 70, a wiper, a direction indicator and so on.

The coasting condition determiner 62 is configured to determine a satisfaction of the condition to execute a coast control. The condition to execute a coast control includes a first condition and a second condition. Specifically, the first condition is satisfied given that a vehicle speed is higher than a predetermined value, that the brake actuator 61 is inactive, that the drive force is not required (i.e., the accelerator pedal is not depressed), that a distance from a car running ahead is greater than a predetermined value, and that a steering angle is smaller than a predetermined value. The second condition includes the SOC level of the battery 27 and a road grade.

The coasting condition determiner 62 determines that the SOC level of the battery 27 is "low" if the SOC level falls between zero and a threshold SOC level, and that the SOC level of the battery 27 is "high" if the SOC level falls between the threshold SOC level and the full level.

In order to detect a road grade, the coasting condition determiner 62 is provided with a road grade detector 75. Specifically, the coasting condition determiner 62 estimates a road grade based on a drive force or a position of the accelerator pedal and longitudinal acceleration, or based on road information contained in the map data of the navigation system. For example, when the vehicle 10 travels on a downhill slope, the road grade detector 75 determines that a downhill grade is "steep" if a downhill grade is steeper than a threshold grade, and that a downhill grade is "mild" or a road is "flat" if a down grade is milder than the threshold grade.

Upon satisfaction of the condition to execute the coast control, the travel controller 57 selects a coasting mode from a first coasting mode, a second coasting mode and a third coasting mode depending on the satisfied condition.

Figure 2:
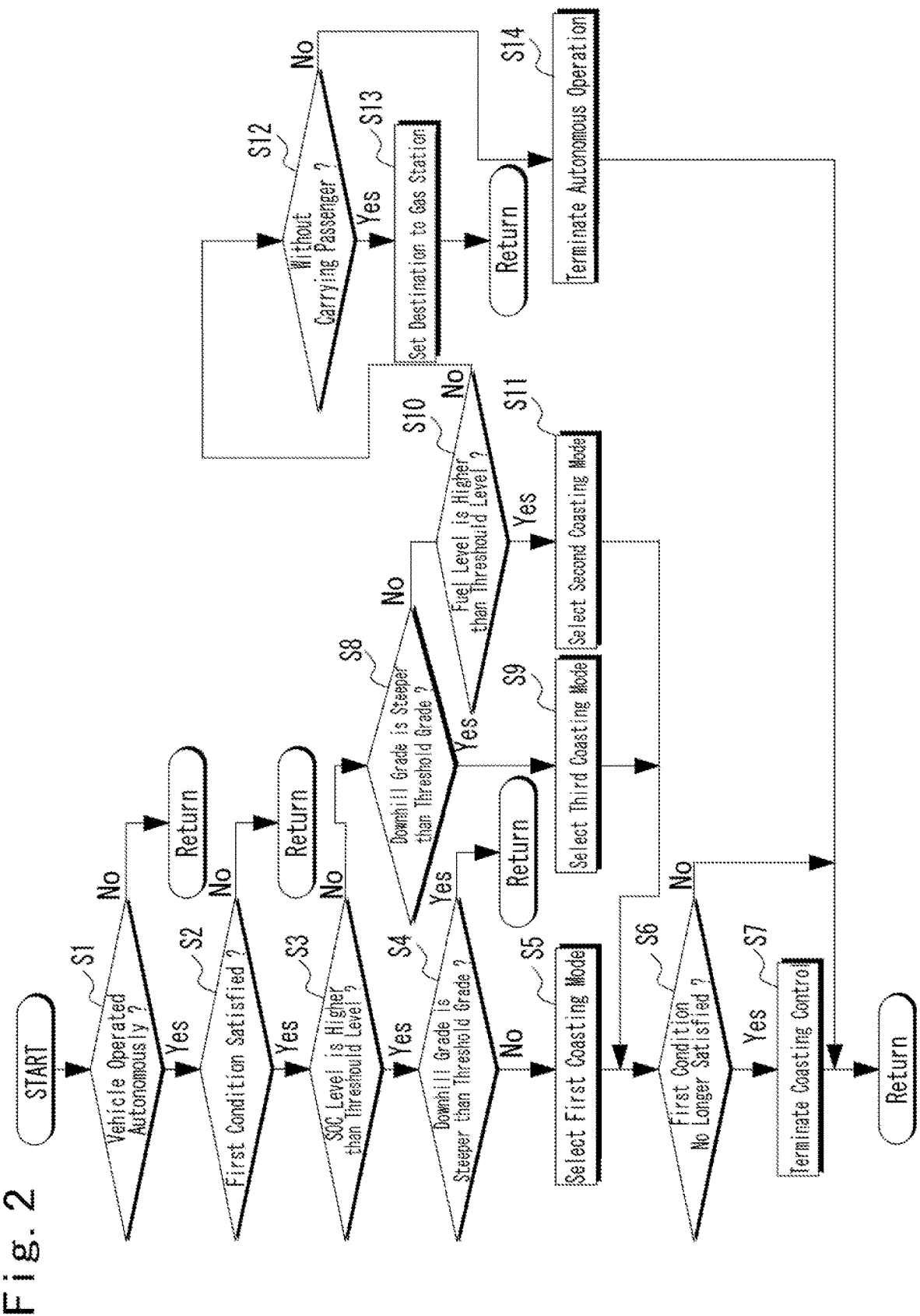
FIG. 2 is a flowchart showing a control example for selecting a coasting mode in the vehicle according to the first example.

Turning to FIG. 2, there is shown a routine to select the coasting mode according to the first example.

At step S1, it is determined whether or not the vehicle 10 is being operated autonomously. If the vehicle 10 is currently not operated autonomously so that the answer of step S1 is NO, the routine returns. By contrast, the vehicle 10 is being operated autonomously so that the answer of step S1 is YES, the routine progresses to step S2 to determine whether or not the first condition is satisfied. If the first condition is not satisfied so that the answer of step S2 is NO, the routine returns. By contrast, if the first condition is satisfied so that the answer of step S2 is YES, the routine progresses to step S3 to determine whether or not the SOC level of the battery 27 falls above the threshold SOC level. If the SOC level of the battery 27 falls above the threshold SOC level, that is, the SOC level of the battery 27 is "high" so that the answer of step S3 is YES, the routine progresses to step S4 to determine whether or not the vehicle 10 is travelling on a downhill slope steeper than the threshold grade. If the downhill grade is steeper than the threshold grade, that is, if the vehicle 10 is travelling on a steep downhill so that the answer of step S4 is YES, the routine returns. By contrast, if the downhill grade is milder than the threshold grade, that is, if the vehicle 10 is travelling on a mild downhill or a flat road so that the answer of step S4 is NO, the routine progresses to step S5 to select the first coasting mode.

Then, at step S6, it is determined whether or not the first condition is no longer satisfied. If the first condition is no longer satisfied so that the answer of step S6 is YES, the routine progresses to step S7 to terminate the coasting control in the first coasting mode, and then returns. By contrast, if the first condition is still satisfied so that the answer of step S6 is NO, the routine also returns.

If the SOC level of the battery 27 falls below the threshold SOC level, that is, the SOC level of the battery 27 is "low" so that the answer of step S3 is NO, the routine progresses to step S8 to determine whether or not the vehicle 10 is travelling on a downhill slope steeper than the threshold grade. If the downhill grade is steeper than the threshold grade, that is, if the vehicle 10 is travelling on a steep downhill so that the answer of step S9 is YES, the routine progresses to step S9 to select the third coasting mode. Then, the routine progresses to step S6.

By contrast, if the downhill grade is milder than the threshold grade, that is, if the vehicle 10 is travelling on a mild downhill or a flat road so that the answer of step S4 is NO, the routine progresses to steep S10 to determine whether or not a fuel level is higher than a predetermined threshold fuel level. If the fuel level is higher than the threshold fuel level so that the answer of step S10 is YES, the routine progresses to step S11 to select the second coasting mode. Then, the routine also progresses to step S6.

By contrast, if the fuel level is lower than the threshold fuel level so that the answer of step S10 is NO, the routine progresses to steep S12 to determine whether or not the vehicle 10 is propelling without carrying a passenger. If the vehicle 10 is propelling without carrying a passenger so that the answer of step S12 is YES, the routine progresses to steep S13 to change a destination of the navigation system to a closest gas station or charging station from a present location of the vehicle 10. Alternatively, a gas station possible to get there earliest in terms of time may also be selected as the destination. Then, the routine returns.

By contrast, if the vehicle 10 is propelling while carrying a passenger so that the answer of step S12 is NO, the routine progresses to steep S14 to terminate autonomous operation or coasting of the vehicle 10. Then, the routine returns. At step S14, optionally, it is possible to notify the driver or passenger of termination of the autonomous operation by an audio means or an indication means.

In the routine shown in FIG. 2, an order of executing determinations of SOC level and road gradient may be altered. In addition, the determination of rode gradient may be omitted.

In addition, an activation of the engine 11 and an engagement of the clutch 17 may be patterned depending on a selected coasting mode, and the engine 11 and the clutch 17 may be controlled separately to allow the vehicle 10 to coast in the selected coasting mode.

Further, the determination of satisfaction of the first condition may also be executed immediately prior to step S5, S9 or S11.

Details of the first coasting mode to the third coasting mode are shown in FIG. 3. In FIG. 3, the electric oil pump 34 is referred to as "EOP", and the mechanical oil pump 43 is referred to as "MOP".

As shown in FIG. 3, during autonomous operation of the vehicle 10, the first coasting mode is selected given that the first condition is satisfied, that the SOC level of the battery 27 is high, and the vehicle 10 travels on a mild downhill or on a flat road.

In the first coasting mode, the engine 11 is stopped, and hence the operating oil is delivered to the hydraulic control system 24 by driving the electric oil pump 34. In addition, generation of the alternator 26 is stopped. Thus, in the first coasting mode, the auxiliary 30 such as the electric oil pump 34 is operated by the battery 27 without generating electric power by the alternator 26. In the first coasting mode, therefore, an electric consumption of the battery 27 is increased in comparison with the second coasting mode and the third coasting mode.

In the first coasting mode, however, the engine 11 is stopped while disengaging the clutch 17. For this reason, fuel consumption may be reduced to improve mileage. In addition, since the SOC level is high, the internal sensor 65 and the external sensor 66 can be activated by the battery 27 to continue the autonomous operation of the vehicle 10.

During autonomous operation of the vehicle 10, the second coasting mode is selected given that the first condition is satisfied, that the SOC level of the battery 27 is low, the vehicle 10 travels on a mild downhill or on a flat road, and the fuel level is high.

In the second coasting mode, the engine 11 is activated but the clutch 17 is disengaged. In this case, since the fuel level is high, the mechanical oil pump 43 is driven by the engine 11 to deliver the operating oil to the hydraulic control system 24. In the second coasting mode, therefore, fuel consumption may be increased in comparison with the first coasting mode and the third coasting mode. However, since the alternator 26 is activated, the battery 27 may be charged with the electricity generated by the alternator 26. In addition, since the electric oil pump 34 is stopped, electric consumption may be reduced. For this reason, the internal sensor 65 and the external sensor 66 may be activated by the battery 27 to continue the autonomous operation of the vehicle 10. In the second coasting mode, optionally, some of the cylinders of the engine 11 may be inactivated.

During autonomous operation of the vehicle 10, the third coasting mode is selected given that the first condition is satisfied, that the SOC level of the battery 27 is high, the vehicle 10 travels down a steep downhill.

In the third coasting mode, the engine 11 is stopped (i.e., inactivated) and the clutch 17 is engaged so that fuel consumption is reduced. In the third coasting mode, since the vehicle 10 is travelling down the steep downhill while engaging the clutch 17, the alternator 26 may be driven by a rotation of the engine 11 to charge the battery 27. In the third coasting mode, therefore, the internal sensor 65 and the external sensor 66 may be activated by the battery 27 to continue the autonomous operation of the vehicle 10, and the mechanical oil pump 43 may be driven by the engine 11 to deliver the operating oil to the hydraulic control system 24. In addition, an engine braking force may be established by thus rotating the engine 11 passively to reduce a vehicle speed.

The third coasting mode may be omitted, and the coasting mode may be selected only from the first coasting mode and the second coasting mode. In addition, the coasting mode may be selected based only on the SOC level of the battery 27. Further, in the third coasting mode, the cylinders of the engine 11 may be halted to reduce the engine braking force.

Second Example

Figure 4:
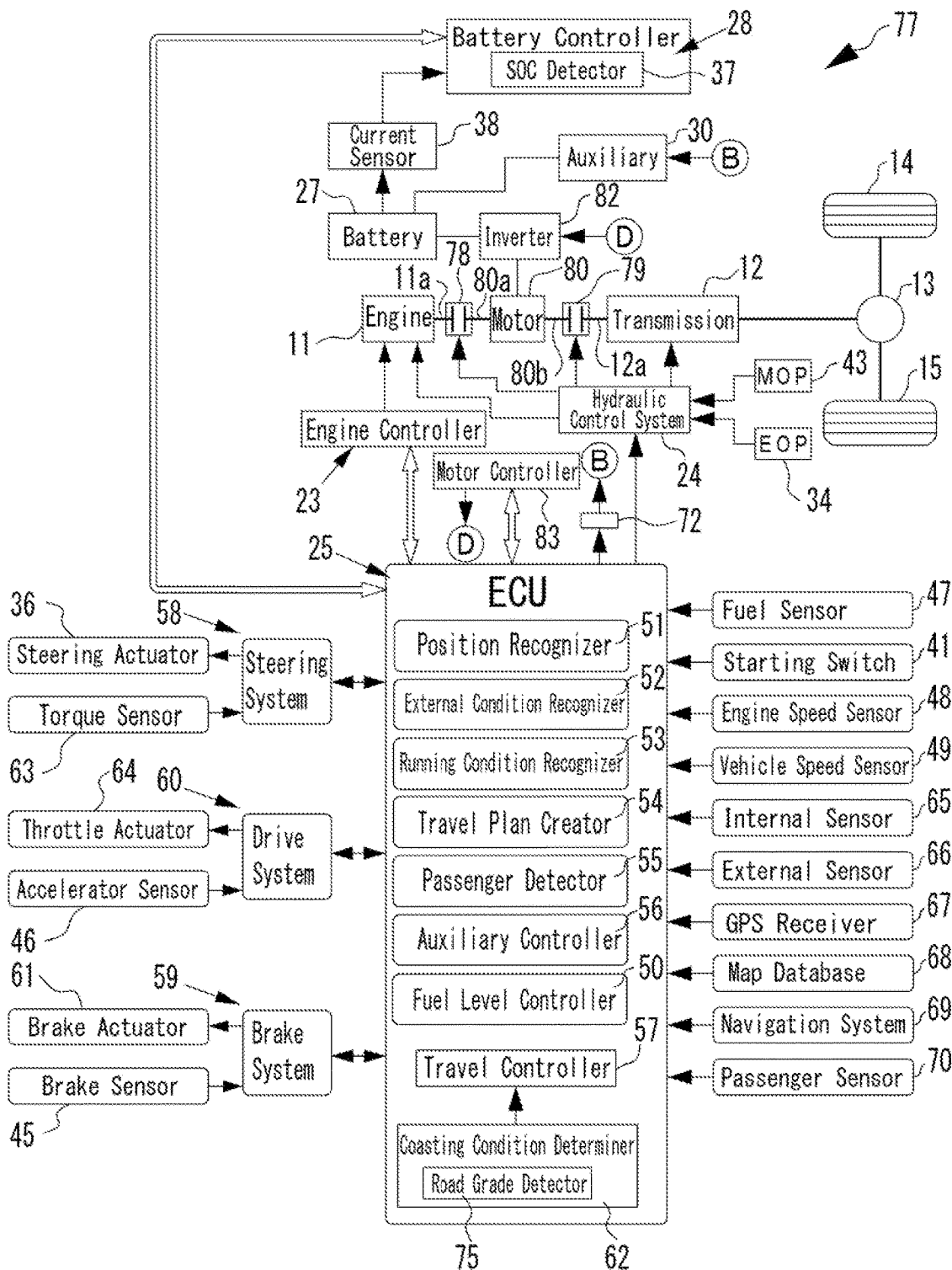
FIG. 4 is a schematic illustration showing a second example of a vehicle to which the control system according to the present disclosure is applied.

Turning to FIG. 4, there is shown the second example of the vehicle to which the control system according to the present disclosure is applied. As illustrated in FIG. 4, the vehicle 77 comprises the engine 11, a first clutch 78, a second clutch 79 and a motor-generator (as will be simply called the "motor" hereinafter) 80 arranged coaxially with the engine 11. The vehicle 77 may be powered only by the motor 80 while disconnecting the engine 11 completely from the powertrain. In addition, when the vehicle is powered by the engine 11, an output power of the motor 80 may be added to an output power of the engine 11 to start or accelerate the vehicle 77.

As shown in FIG. 4, the first clutch 78 is interposed between the output shaft 11a of the engine 11 and an input shaft 80a of the motor 80 to selectively transmit power therebetween. On the other hand, the second clutch 79 is interposed between an output shaft 80b of the motor 80 and the input shaft 12a of the transmission 12 to selectively transmit power therebetween. Both of the first clutch 78 and the second clutch 79 are actuated hydraulically the operating oil delivered from the hydraulic control system 24.

For example, a permanent magnet synchronous motor may be used as the motor 80. Specifically, the motor 80 comprises a rotor in which permanent magnets are arranged on an outer circumferential face, and a stator in which a three-phase coil is wound (neither of which are shown). When the motor 80 is energized by the electricity supplied from the battery 27, the motor 80 generates a kinetic power, and when the motor 80 is rotated by a power delivered from the drive wheels 14 and 15, the motor 80 generates an electric power. The electric power generated by the motor 80 is delivered to the battery 27 through an inverter 82. A regenerative torque resulting from power regeneration of the motor 80 may be utilized as an engine braking force. In addition, the motor 80 may also be used to crank the engine 11.

When operating the motor 80 as a motor, the inverter 82 is controlled by a motor controller 83 in such a manner as to convert direct current supplied from the battery 27 to alternate current, and to supply alternate current to the motor 80 to generate torque. By contrast, when operating the motor 80 as a generator, the inverter 82 is controlled by a motor controller 83 in such a manner as to convert alternate current generated by the motor 80 to direct current, and to charge the battery 27 with direct current. Thus, the inverter 82 serves as a rectifier and a voltage regulator.

As described, the coasting condition determiner 62 is configured to determine a satisfaction of the condition to execute the coast control. As also described, the first condition is satisfied given that a vehicle speed is higher than a predetermined value, that the brake actuator 61 is inactive, that the drive force is not required (i.e., the accelerator pedal is not depressed), that a distance from a car running ahead is greater than the predetermined value, and that a steering angle is smaller than the predetermined value. The second condition includes the SOC level of the battery 27 and a road grade.

According to the second example, the coasting condition determiner 62 determines that the SOC level of the battery 27 is "low" if the SOC level falls between zero and a first threshold SOC level, that the SOC level of the battery 27 is "medium" if the SOC level falls between the first threshold SOC level and a second SOC level, and that the SOC level of the battery 27 is "high" if the SOC level falls above the second threshold SOC level.

According to the second example, the road grade detector 75 determines that a downhill grade is "steep" if a downhill grade is steeper than a first threshold grade, that a downhill grade is "mild" if a down grade is milder than the first threshold grade but steeper than a second threshold grade, and that a road is "flat" if a down grade is milder than the second threshold grade.

As described, the travel controller 57 selects the coasting mode from a plurality of coasting modes depending on a running condition.

Figure 5:
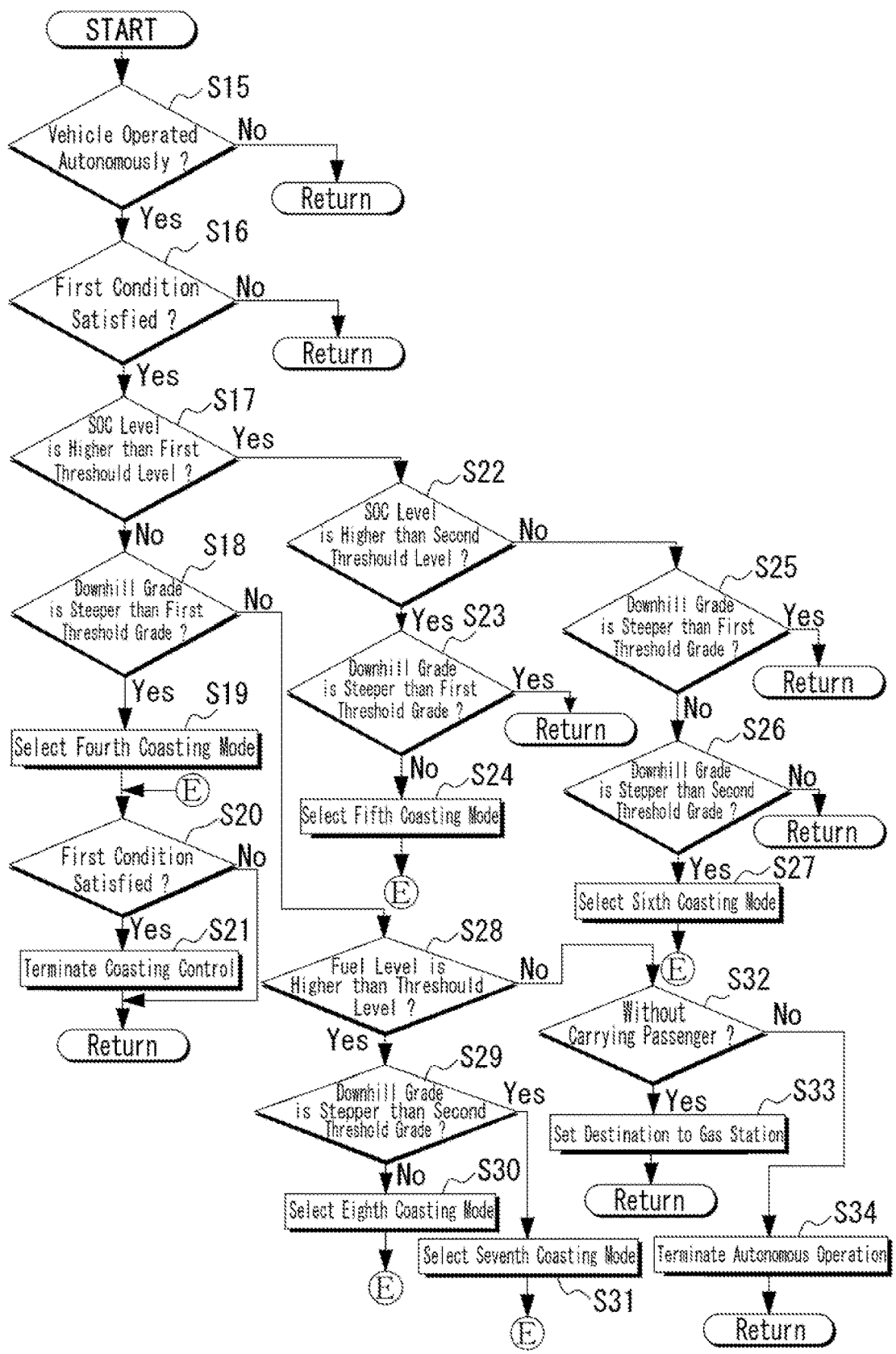
FIG. 5 is a flowchart showing a control example for selecting the coasting mode in the vehicle according to the second example.

Turning to FIG. 5, there is shown a routine to select the coasting mode according to the second example.

At step S15, it is determined whether or not the vehicle 77 is being operated autonomously. If the vehicle 77 is currently not operated autonomously so that the answer of step S15 is NO, the routine returns. By contrast, the vehicle 77 is being operated autonomously so that the answer of step S15 is YES, the routine progresses to step S16 to determine whether or not the first condition is satisfied. If the first condition is not satisfied so that the answer of step S16 is NO, the routine returns. By contrast, if the first condition is satisfied so that the answer of step S16 is YES, the routine progresses to step S17 to determine whether or not the SOC level of the battery 27 falls above the first threshold SOC level. If the SOC level of the battery 27 falls below the first threshold SOC level, that is, the SOC level of the battery 27 is "low" so that the answer of step S17 is NO, the routine progresses to step S18 to determine whether or not the vehicle 77 is travelling on a downhill slope steeper than the first threshold grade. If the downhill grade is steeper than the first threshold grade, that is, if the vehicle 77 is travelling on a steep downhill so that the answer of step S18 is YES, the routine progresses to step S19 to select a fourth coasting mode.

Then, at step S20, it is determined whether or not the first condition is no longer satisfied. If the first condition is no longer satisfied so that the answer of step S20 is YES, the routine progresses to step S21 to terminate the coasting control in the first coasting mode, and then returns. By contrast, if the first condition is still satisfied so that the answer of step S21 is NO, the routine also returns.

If the SOC level of the battery 27 falls above the first threshold SOC level, that is, the SOC level of the battery 27 is "high" or "medium" so that the answer of step S17 is YES, the routine progresses to step S22 to determine whether or not the SOC level of the battery 27 falls above the second threshold SOC level. If the SOC level of the battery 27 falls above the second threshold SOC level, that is, the SOC level of the battery 27 is "high" so that the answer of step S22 is YES, the routine progresses to step S23 to determine whether or not the vehicle 77 is travelling on a downhill slope steeper than the first threshold grade. If the downhill grade is milder than the first threshold grade, that is, if the vehicle 77 is travelling on a mild downhill or a flat road so that the answer of step S23 is NO, the routine progresses to step S24 to select a fifth coasting mode. Then, the routine also progresses to step S20. By contrast, if the downhill grade is steeper than the first threshold grade, that is, if the vehicle 77 is travelling on a steep downhill so that the answer of step S23 is YES, the routine returns. In this case, alternatively, the fourth coasting control may also be selected, or a current coasting mode may also be maintained.

If the SOC level of the battery 27 falls below the second threshold SOC level, that is, the SOC level of the battery 27 is "medium" so that the answer of step S22 is NO, the routine progresses to step 25 to determine whether or not determine whether or not the vehicle 77 is travelling on a downhill slope steeper than the first threshold grade. If the downhill grade is milder than the first threshold grade, that is, if the vehicle 77 is travelling on a mild downhill or a flat road so that the answer of step S25 is NO, the routine progresses to step S26 to determine whether or not the vehicle 77 is travelling on a downhill slope steeper than the second threshold grade. If the downhill grade is steeper than the second threshold grade, that is, if the vehicle 77 is travelling down a mild downhill so that the answer of step S26 is YES, the routine progresses to step S27 to select a sixth coasting mode. Then, the routine also progresses to step S20.

By contrast, if the downhill grade is steeper than the first threshold grade, that is, if the vehicle 77 is travelling on a steep downhill so that the answer of step S25 is YES, the routine returns. In this case, alternatively, the fourth coasting control may also be selected or a current coasting mode may also be maintained. Likewise, if the downhill grade is milder than the second threshold grade, that is, if the vehicle 77 is travelling on a flat road so that the answer of step S26 is NO, the routine also returns. In this case, alternatively, the fifth or eighth coasting control may also be selected, or a current coasting mode may also be maintained.

If the downhill grade is milder than the first threshold grade, that is, if the vehicle 77 is travelling on a mild downhill or a flat road so that the answer of step S18 is NO, the routine progresses to step S28 to determine whether or not the fuel level is higher than a predetermined threshold fuel level. If the fuel level is higher than the threshold fuel level so that the answer of step S28 is YES, the routine progresses to step S29 to determine whether or not the vehicle 77 is travelling on a downhill slope steeper than the second threshold grade. If the downhill grade is milder than the second threshold grade, that is, if the vehicle 77 is travelling on a flat road so that the answer of step S29 is NO, the routine progresses to step S30 to select the eighth coasting mode. Then, the routine also progresses to step S20.

By contrast, if the downhill grade is steeper than the second threshold grade, that is, if the vehicle 77 is travelling down a mild downhill so that the answer of step S29 is YES, the routine progresses to step S31 to select a seventh coasting mode. Then, the routine also progresses to step S20.

If the fuel level is lower than the threshold fuel level so that the answer of step S28 is NO, the routine progresses to steep S32 to determine whether or not the vehicle 77 is propelling without carrying a passenger. If the vehicle 77 is propelling without carrying a passenger so that the answer of step S32 is YES, the routine progresses to steep S33 to change a destination of the navigation system to a closest gas station or charging station from a present location of the vehicle 77. Alternatively, a gas station possible to get there earliest in terms of time may also be selected as the destination. Then, the routine returns.

By contrast, if the vehicle 77 is propelling while carrying a passenger so that the answer of step S32 is NO, the routine progresses to steep S34 to terminate autonomous operation or coasting of the vehicle 77. Then, the routine returns.

In the routine shown in FIG. 5, an order of executing determinations of the SOC level and the road gradient may also be altered. In addition, the autonomous operation of the vehicle 77 may also be terminated without taking account of the road gradient. In addition, an activation of the engine 11, and an engagement of each of the first clutch 78 and the second clutch 79 may be patterned depending on a selected coasting mode, and the engine 11 and the clutches 78 and 79 may be controlled separately to allow the vehicle 77 to coast in the selected coasting mode.

Further, the determination of satisfaction of the first condition may also be executed immediately prior to step S19, S24, S27, S31 or S30. In addition, the sixth to eight coasting modes may be omitted. In this case, the coasting control is selected from the fourth coasting mode and the fifth coasting mode.

Details of the fourth coasting mode to the eighth coasting mode are shown in FIG. 6. In FIG. 6, the electric oil pump 34 is referred to as "EOP", and the mechanical oil pump 43 is referred to as "MOP".

As shown in FIG. 6, during autonomous operation of the vehicle 77, the fourth coasting mode is selected given that the first condition is satisfied, that the SOC level of the battery 27 is low, and the vehicle 77 travels on a steep downhill. In the fourth coasting mode, the engine 11 is stopped (i.e., inactivated) and both of the first clutch 78 and the second clutch 79 are engaged so that the engine 11 and the motor 80 are rotated by torque delivered from the drive wheels 14 and 15.

In the fourth coasting mode, since the engine 11 is stopped, fuel consumption is reduced in comparison with the seventh coasting mode and the eighth coasting mode. Moreover, since the vehicle 77 is travelling down the steep downhill while engaging the first clutch 78 and the second clutch 79, the motor 80 may be operated as a generator to charge the battery 27, and the mechanical oil pump 43 may be driven by the engine 11 to deliver the operating oil to the hydraulic control system 24. That is, in the fourth coasting mode, it is not necessary to operate the electric oil pump 34. In the fourth coasting mode, therefore, electric consumption may be reduced in comparison with the fifth coasting mode and the sixth coasting mode. In addition, strongest engine braking force may be established by thus rotating the engine 11 passively to reduce vehicle speed.

During autonomous operation of the vehicle 77, the fifth coasting mode is selected given that the first condition is satisfied, that the SOC level of the battery 27 is high, and the vehicle 77 travels on a mild downhill or on a flat road. In the fifth coasting mode, both of the first clutch 78 and the second clutch 79 are disengaged to disconnect the engine 11 and the motor 80 from the drive wheels 14 and 15, and the engine 11 is stopped.

In the fifth coasting mode, therefore, the motor 80 may not be operated as a generator. In addition, the electric oil pump 34 is activated to deliver the operating oil to the hydraulic control system 24. That is, in the fifth coasting mode, the auxiliary 30 such as the electric oil pump 34 is operated by the battery 27 without charging the battery 27. For this reason, an electric consumption of the battery 27 may be increased in comparison with the fourth, the seventh and the eighth coasting modes.

During autonomous operation of the vehicle 77, the sixth coasting mode is selected given that the first condition is satisfied, that the SOC level of the battery 27 is medium, and that the vehicle 77 travels on a mild downhill. In the sixth coasting mode, the engine 11 is stopped and disconnected from the drive wheels 14 and 15 by disengaging the first clutch 78 while engaging the second clutch 79.

In the sixth coasting mode, since the engine 11 is stopped, fuel consumption is reduced in comparison with the seventh coasting mode and the eighth coasting mode. However, although the motor 80 is operated as a generator to charge the battery 27, the electricity of the battery 27 is consumed to operate the auxiliary 30 such as the electric oil pump 34. In the sixth coasting mode, therefore, an electric consumption of the battery 27 may be increased in comparison with the fourth, the sixth the seventh and the eighth coasting modes. In the sixth coasting mode, the engine braking force may also be established by the regenerative torque of the motor 80, and such engine braking force is stronger than that established in the fifth coasting mode.

During autonomous operation of the vehicle 77, the seventh coasting mode is selected given that the first condition is satisfied, that the fuel level is high, that the SOC level of the battery 27 is low, and that the vehicle 77 travels on a mild downhill. In the seventh coasting mode, the engine 11 is operated but disconnected from the drive wheels 14 and 15 by disengaging the first clutch 78 while engaging the second clutch 79. In the seventh coasting mode, optionally, some of the cylinders of the engine 11 may be inactivated.

In the seventh coasting mode, since the fuel level is high, the mechanical oil pump 43 may be driven by the engine 11 to deliver the operating oil to the hydraulic control system 24. In the seventh coasting mode, therefore, fuel consumption may be increased in comparison with the fourth to sixth coasting modes. However, since the electric oil pump 34 is allowed to be stopped, electric consumption may be reduced. In addition, since the second clutch 79 is in engagement, the motor 80 may be rotated by the torque delivered from the drive wheels 14 and 15 to serve as a generator so as to charge the battery 27. For this reason, electric consumption of the battery 27 may be reduced in comparison with the fifth coasting mode. In addition, the engine braking force may also be established by the regenerative torque of the motor 80.

During autonomous operation of the vehicle 77, the eighth coasting mode is selected given that the first condition is satisfied, that the fuel level is high, that the SOC level of the battery 27 is low, and the vehicle 77 travels on a flat road. In the eighth coasting mode, the engine 11 is operated but the engine 11 and the motor 80 are disconnected from the drive wheels 14 and 15 by engaging the first clutch 78 while disengaging the second clutch 79. In the eighth coasting mode, optionally, some of the cylinders of the engine 11 may be inactivated.

In the eighth coasting mode, since the fuel level is high, the mechanical oil pump 43 may also be driven by the engine 11 to deliver the operating oil to the hydraulic control system 24. In the eighth coasting mode, therefore, the electric oil pump 34 may also be stopped. In addition, the motor 80 may be rotated by the engine 11 to charge the battery 27. For this reason, electric consumption of the battery 27 may be reduced in comparison with the fifth and the sixth coasting modes. In the eighth coasting mode, however, the second clutch 79 is in disengagement and hence the engine braking force generated by the regenerative torque of the motor 80 may not be applied to the drive wheels 14 and 15. That is, fuel consumption may be reduced.

Third Example

Figure 7:
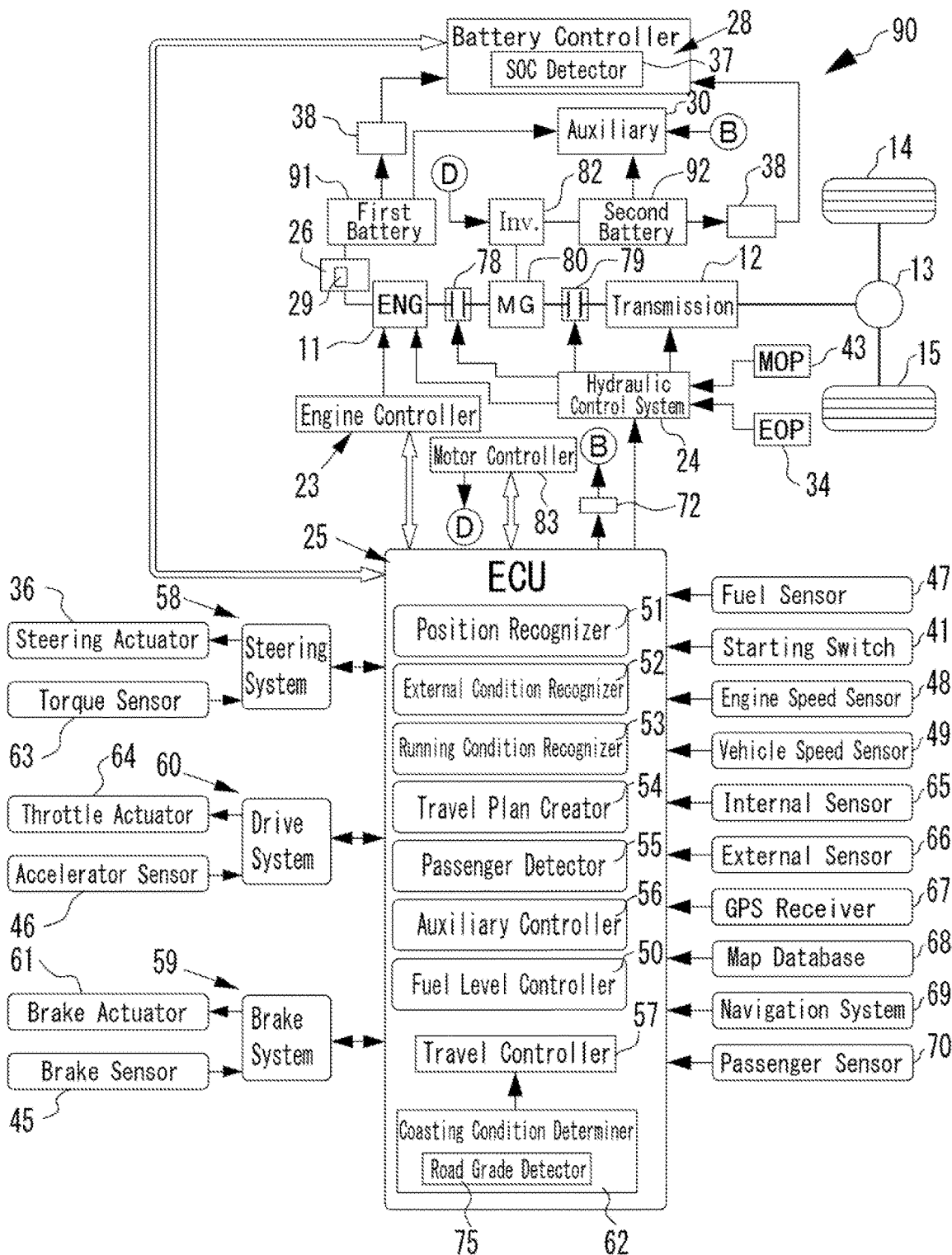
FIG. 7 is a schematic illustration showing a third example of a vehicle to which the control system according to the present disclosure is applied.

Turning to FIG. 7, there is shown the third example of the vehicle to which the control system according to the present disclosure is applied. As illustrated in FIG. 7, in the vehicle 90 according to the third example, the alternator 26 used in the first example is arranged in the vehicle 77 according to the second example. The vehicle 90 further comprises: a first battery 91 as a low-voltage battery that is charged with electricity generated by the alternator 26, and that supplies electricity to the auxiliaries 30 activated by low-voltage such as the internal sensor 65 and the external sensor 66; and a second battery 92 as a high-voltage battery that is charged with electricity generated by the motor 80, and that supplies electricity to the auxiliaries 30 activated by high voltage such as the steering actuator 36. According to the third example, the SOC detector 37 of the battery controller 28 is adapted to detect an SOC level of each of the first battery 91 and the second battery 92.

As described, the travel controller 57 selects the coasting mode from a plurality of coasting modes depending on a running condition including an SOC level of each of the first battery 91 and the second battery 92.

Details of a ninth coasting mode to a thirteenth coasting mode are shown in FIG. 8. The ninth coasting mode is selected upon satisfaction of the same condition as the fourth coasting mode, and details of the ninth coasting mode is substantially identical to those of the fourth coasting mode. In the ninth coasting mode, specifically, the engine 11 is stopped (i.e., inactivated) and both of the first clutch 78 and the second clutch 79 are engaged.

In the ninth coasting mode, the first battery 91 and the second battery 92 may be charged by both of the alternator 26 and the motor 80. For this reason, reduction in the SOC levels of the first battery 91 and the second battery 92 may be prevented in comparison with a tenth coasting mode and an eleventh coasting mode. In addition, strong engine braking force may be established by regenerative torque of the motor 80 and pumping loss of the engine 11 itself to reduce vehicle speed when travelling down the steep downhill.

In the tenth coasting mode, both of the first clutch 78 and the second clutch 79 are disengaged to disconnect the engine 11 and the motor 80 from the drive wheels 14 and 15, and the engine 11 is stopped. During autonomous operation of the vehicle 90, the tenth coasting mode is selected given that the first condition is satisfied, that the SOC levels of the first battery 91 and the second battery 92 are high, and the vehicle 90 travels on a mild downhill or on a flat road. Thus, the tenth coasting mode is selected upon satisfaction of the same conditions as the fifth coasting mode.

In the eleventh coasting mode, the engine 11 is stopped and disconnected from the drive wheels 14 and 15 by disengaging the first clutch 78 while engaging the second clutch 79. As the sixth coasting mode of the second example, the eleventh coasting mode is selected during autonomous operation of the vehicle 90 given that the first condition is satisfied, that the SOC levels of the first battery 91 and the second battery 92 are medium, and that the vehicle 90 travels on a mild downhill.

In the eleventh coasting mode, the second battery 92 may be charged while operating the low-voltage auxiliary 30 such as the electric oil pump 34 by supplying electricity from the first battery 91. In the eleventh coasting mode, engine braking force stronger than that established in the tenth coasting mode may be established by regenerative torque of the motor 80.

In the twelfth coasting mode, the engine 11 is operated but disconnected from the drive wheels 14 and 15 by disengaging the first clutch 78 while engaging the second clutch 79. As the seventh coasting mode of the second example, the twelfth coasting mode is selected during autonomous operation of the vehicle 90 given that the first condition is satisfied, the SOC levels of the first battery 91 and the second battery 92 are low, and that the vehicle 90 travels on a mild downhill.

In the twelfth coasting mode, the first battery 91 and the second battery 92 may also be charged by both of the alternator 26 and the motor 80. For this reason, reduction in the SOC levels of the first battery 91 and the second battery 92 may be prevented in comparison with the tenth coasting mode and the eleventh coasting mode. In addition, engine braking force stronger than that established in the tenth coasting mode may be established by regenerative torque of the motor 80.

In the thirteenth coasting mode, the engine 11 is operated the first clutch 78 is engaged, and the second clutch 79 is disengaged. As the eighth coasting mode, during autonomous operation of the vehicle 90, the thirteenth coasting mode is selected given that the first condition is satisfied, the SOC levels of the first battery 91 and the second battery 92 are low, and that the vehicle 90 travels on a flat road.

In the thirteenth coasting mode, electric consumption of any of the first battery 91 and the second battery 92 may be reduced in comparison with the tenth coasting mode and the eleventh coasting mode. In addition, since the second clutch 79 is disengaged, the engine braking force generated by regenerative torque of the motor 80 is not applied to the drive wheels 14 and 15. For this reason, the vehicle 90 is allowed to coast while saving the fuel.

Although the above exemplary embodiments of the present application have been described, it will be understood by those skilled in the art that the present application should not be limited to the described exemplary embodiments, and various changes and modifications can be made within the spirit and scope of the present application.

For example, in the vehicle 10 according to the first example, a motor-generator may also be arranged in addition to the engine 11 while omitting the alternator 26. In this case, output power of the engine 11 is distributed to the output shaft and the motor-generator so that the motor-generator is allowed to be rotated passively by the output power of the engine 11 to generate electric power. An output torque of the motor-generator may also be added to an output torque of the engine 11.

In addition, a second motor as a motor-generator may also be arranged in the vehicle 77 according to the second example. In this case, output power of the engine 11 is distributed to the output shaft and the second motor through an additional power split device so that the second motor is allowed to be rotated passively by the output power of the engine 11 to generate electric power. In this case, as the third example, the first clutch 78 may be interposed between the output shaft and the second motor, and the second clutch 79 may be interposed between the second motor and the transmission 12.

What is claimed is:
1. A control system for a vehicle, comprising:
an engine wherein some of cylinders of the engine may be inactivated;
a generator that is driven by a rotation of the engine to generate electricity;
a battery that is charged by the electricity generated by the generator;
a plurality of actuators including at least any one of a brake actuator and a steering actuator actuated by the electricity supplied from the battery;
a pair of drive wheels that is rotated by a drive force delivered from the engine to propel the vehicle, wherein the vehicle is allowed to coast without delivering the drive force to propel the vehicle from the engine to the drive wheels;
a clutch that selectively interrupts power transmission between the engine and the drive wheels; and
the control system comprises a controller that is configured to execute a coasting control of the vehicle, the controller comprising:
a coasting condition determiner that determines a satisfaction of a condition to execute the coasting control upon satisfaction of at least one of the following conditions that a speed of vehicle is higher than a predetermined value, that the brake actuator is inactive, that the drive force is not required, that a distance from a car running ahead is greater than a predetermined value, and that a steering angle of the steering actuator is smaller than a predetermined value;

a running condition determiner that determines a condition of the vehicle when the coasting condition determiner determines a satisfaction of the condition to execute the coasting control;

a coasting controller that executes the coasting control depending on the condition of the vehicle determined by the running condition determiner, when the coasting condition determiner determines a satisfaction of the condition to execute the coasting control; and a fuel level detector that detects a fuel level of the engine;

wherein the coasting control includes an engine activating coast mode in which the engine is activated while disconnecting the engine from the drive wheels by the clutch; and wherein the controller is configured to inactivate some of the cylinders of the engine:
during propulsion in the engine activating coast mode; and
when the fuel level is equal to or higher than a predetermined level.

2. A control system for a vehicle, comprising:
an engine;
a generator that is driven by a rotation of the engine to generate electricity;
a battery that is charged by the electricity generated by the generator;
a plurality of actuators including at least any one of a brake actuator and a steering actuator actuated by the electricity supplied from the battery;
a pair of drive wheels that is rotated by a drive force delivered from the engine to propel the vehicle, wherein the vehicle is allowed to coast without delivering the drive force to propel the vehicle from the engine to the drive wheels;
a steering system that controls a steering angle, a drive system that controls the drive force, and a brake system that controls a braking force; and
the control system comprises:
a controller that is configured to execute a coasting control of the vehicle, the controller comprising:
a coasting condition determiner that determines a satisfaction of a condition to execute the coasting control upon satisfaction of at least one of the following conditions that a speed of vehicle is higher than a predetermined value, that the brake actuator is inactive, that the drive force is not required, that a distance from a car running ahead is greater than a predetermined value, and that a steering angle of the steering actuator is smaller than a predetermined value;
a running condition determiner that determines a condition of the vehicle when the coasting condition determiner determines a satisfaction of the condition to execute the coasting control;
a coasting controller that executes the coasting control depending on the condition of the vehicle determined by the running condition determiner, when the coasting condition determiner determines a satisfaction of the condition to execute the coasting control; and
a fuel level detector that detects a fuel level of the engine;

a travel plan creator that creates a travel plan including a travel locus of the vehicle;
wherein the controller is further configured to inactivate some of cylinders of the engine when the fuel level is equal to or higher than a predetermined level; and
wherein the vehicle includes an autonomous vehicle that can be operated autonomously without requiring a driver to operate the vehicle, by controlling the steering system, the drive system, and the brake system in line with the travel plan created by the travel plan creator.

3. The control system as claimed in claim 2,
wherein some of the cylinders of the engine may be inactivated,
the vehicle further comprises a clutch that selectively interrupts power transmission between the engine and the drive wheels,
the coasting control includes an engine activating coast mode in which the engine is activated while disconnecting the engine from the drive wheels by the clutch, and
the controller is further configured to inactivate some of the cylinders of the engine during propulsion in the engine activating coast mode.

4. The control system as claimed in claim 2, wherein the vehicle further comprises an indicator, and the controller is further configured to notify the driver of termination of the autonomous operation visually or phonically by the indicator, when terminating the autonomous operation of the vehicle and starting to operate the vehicle manually by the driver.

5. A control method of a vehicle, comprising:
an engine;
a generator that is driven by a rotation of the engine to generate electricity;
a battery that is charged by the electricity generated by the generator;
a plurality of actuators including at least any one of a brake actuator and a steering actuator actuated by the electricity supplied from the battery; and
a pair of drive wheels that is rotated by a drive force delivered from the engine to propel the vehicle, wherein the vehicle is allowed to coast without delivering the drive force to propel the vehicle from the engine to the drive wheels,
the control method comprising:
detecting at least one of the following conditions that a speed of vehicle is higher than a predetermined value, that the brake actuator is inactive, that the drive force is not required, that a distance from a car running ahead is greater than a predetermined value, and that a steering angle of the steering actuator is smaller than a predetermined value;
determining a satisfaction of a condition to execute a coasting control of the vehicle if any one of said conditions is detected;
determining a condition of the vehicle when a satisfaction of the condition to execute the coasting control is determined; and
thereafter executing the coasting control depending on the determined condition of the vehicle;
disconnecting the engine from the drive wheels when executing the coasting control upon satisfaction of the condition;
inactivating some of cylinders of the engine during execution of the coasting control;
detecting a fuel level of the engine; and inactivating some of the cylinders of the engine when the fuel level is equal to or higher than a predetermined level.

6. The control method as claimed in claim 5, wherein the vehicle includes an autonomous vehicle that can be operated autonomously without requiring a driver to operate the vehicle, by autonomously controlling a steering angle, the drive force, and a braking force.

7. The control method as claimed in claim 6, further comprising:
notifying the driver of termination of the autonomous operation when terminating the autonomous operation.

* * * * *